US010555458B2

(12) United States Patent
Takla

(10) Patent No.: US 10,555,458 B2
(45) Date of Patent: Feb. 11, 2020

(54) LEAF SHREDDER TRIMMER ATTACHMENT

(71) Applicant: Refaat Emil Ghabranious Takla, Germantown, MD (US)

(72) Inventor: Refaat Emil Ghabranious Takla, Germantown, MD (US)

(*) Notice: Subject to any disclaimer, the term of this patent is extended or adjusted under 35 U.S.C. 154(b) by 0 days.

(21) Appl. No.: 15/291,629

(22) Filed: Oct. 12, 2016

(65) Prior Publication Data
US 2017/0135282 A1    May 18, 2017

Related U.S. Application Data

(60) Provisional application No. 62/240,285, filed on Nov. 12, 2015.

(51) Int. Cl.
*A01D 34/416*    (2006.01)
*A01G 3/00*    (2006.01)

(52) U.S. Cl.
CPC ......... *A01D 34/4167* (2013.01); *A01G 3/002* (2013.01)

(58) Field of Classification Search
CPC .............. A01D 34/4167; A01D 42/005; A01D 34/4166; A01D 34/4168; A01G 3/002
USPC ................................ 56/17.4, 320.1
See application file for complete search history.

(56) References Cited

U.S. PATENT DOCUMENTS

| | | | | |
|---|---|---|---|---|
| 3,208,209 A | * | 9/1965 | Dunlap | A01D 34/416 56/295 |
| 4,112,653 A | * | 9/1978 | Ballas | A01D 34/4168 56/12.7 |
| 4,329,834 A | * | 5/1982 | Hetrick | A01D 34/73 56/295 |
| 4,389,836 A | * | 6/1983 | Lowry | A01D 34/001 56/12.7 |
| 4,651,422 A | * | 3/1987 | Everts | A01D 34/4163 30/347 |
| 4,726,176 A | * | 2/1988 | McGrew | A01D 34/416 30/276 |
| 4,756,147 A | * | 7/1988 | Savell | A01D 34/001 56/16.7 |
| 4,823,464 A | * | 4/1989 | Gorski | A01G 3/062 30/276 |

(Continued)

*Primary Examiner* — Thomas B Will
*Assistant Examiner* — Joan D Misa
(74) *Attorney, Agent, or Firm* — Miles & Stockbridge P.C.

(57) ABSTRACT

The modular leaf shredder includes a housing having a plurality of interlocking housing subsections. The modular leaf shredder further includes a trimmer connector adapted to form a physical connection with a cooperating member of a trimmer in order to physically join the housing to the trimmer. The head of the trimmer includes a rotating head having at least three sets of cutting wires, at least two sets of cutting wires being substantially perpendicular to each other. A modular leaf shredder is provided. The modular leaf shredder includes a housing having a plurality of interlocking housing subsections. The modular leaf shredder further includes a trimmer connector adapted to form a physical connection with a cooperating member of a trimmer in order to physically join the housing to the trimmer. The head of the trimmer includes a rotating head having at least three sets of cutting wires, at least two sets of cutting wires being substantially perpendicular to each other.

20 Claims, 6 Drawing Sheets

(56) References Cited

U.S. PATENT DOCUMENTS

| | | | | |
|---|---|---|---|---|
| 4,845,889 | A * | 7/1989 | Taylor | A01G 13/0237 47/32.4 |
| 4,905,465 | A * | 3/1990 | Jones | A01D 34/4168 30/276 |
| 4,928,457 | A * | 5/1990 | Laperle | A01D 34/416 30/276 |
| 5,048,278 | A * | 9/1991 | Jones | A01D 34/4166 30/276 |
| 5,077,898 | A * | 1/1992 | Hartwig | A01D 34/90 30/276 |
| 5,115,870 | A * | 5/1992 | Byrne | A01D 34/416 172/15 |
| 5,313,770 | A * | 5/1994 | Smothers | A01D 34/416 30/276 |
| D347,773 | S * | 6/1994 | Nash | D8/8 |
| 5,423,126 | A * | 6/1995 | Byrne | A01D 34/416 30/276 |
| 5,479,763 | A * | 1/1996 | Coble | A01D 34/416 56/12.7 |
| 5,713,191 | A * | 2/1998 | Welton | A01D 34/416 30/276 |
| 5,878,556 | A * | 3/1999 | Franz | A01D 34/416 172/15 |
| 5,901,448 | A * | 5/1999 | Lingerfelt | A01D 34/4166 30/276 |
| 6,158,129 | A * | 12/2000 | Klein | A01D 34/4166 30/276 |
| 6,370,854 | B1 * | 4/2002 | Moore | A01D 34/001 56/16.7 |
| 6,715,270 | B1 * | 4/2004 | Yandle, II | A01D 34/4166 30/276 |
| 7,216,471 | B1 * | 5/2007 | Hassan | A01D 34/82 56/12.7 |
| 7,284,331 | B2 * | 10/2007 | Paddock | A01D 34/828 30/276 |
| 7,458,161 | B2 * | 12/2008 | Wilson | A01G 3/0535 30/276 |
| 8,918,999 | B2 * | 12/2014 | Proulx | A01D 34/4165 30/276 |
| 2004/0020060 | A1 * | 2/2004 | Peterson | A01D 34/4167 30/276 |
| 2004/0148783 | A1 * | 8/2004 | Cashman | A01D 34/416 30/276 |
| 2011/0179757 | A1 * | 7/2011 | Scott-Stanbridge | A01D 34/695 56/12.8 |

* cited by examiner

100

200

400

LEAF SHREDDER TRIMMER ATTACHMENT

PRIORITY APPLICATION

This application claims the benefit of U.S. Provisional Application Ser. No. 62/240,285, which was filed on Nov. 12, 2015, and which is incorporated herein by reference in its entirety.

FIELD OF THE INVENTION

The embodiments of the present invention generally relate to leaf shredding devices and, more particularly, to modular leaf shredding devices that are configured to be detachably coupled to a variety of trimming devices.

Discussion of the Related Art

As part of a property owner's responsibility regarding maintenance of their property, naturally occurring elements must periodically be removed from the property, and often from the ground. A common element that may need removal is an accumulation of leaves that may fall from trees and other plants.

Landscapers, gardeners, and homeowners alike have become accustomed to the hassles associated with the falling foliage of the autumn season. Although falling leaves produce a variety of beautiful colors, they also produce the nuisances associated with their collection and removal. In particular, the nuisance seems to be exponentially amplified in wooded neighborhoods. To this end, combinations of rakes, blowers, trash bags, composting methods, and the like are used to collect and remove leaves.

Although some approaches for leaf disposal have been developed by the gardening industry, the most common approach still remains raking or blowing leaves into large piles, followed by the dreaded task of bagging the leaves for disposal. Leaves are lightweight, but nevertheless the transporting of bagged leaves remains tedious, time-consuming, and labor-intensive as several bags may result from even a single tree.

In connection with other duties in maintaining a property, weed trimmers are typically used to cut grass or weeds in areas where lawn mowers cannot be used. Such areas may be alongside buildings, fences, or in flower or vegetable gardens where a lawn mower has a cutting width larger than the garden rows or cannot get close enough to the buildings or fences. In addition, weed trimmers cause debris to be randomly propelled into the air. As a result, an operator of a weed trimmer may be struck by flying debris such as weeds, grass, dirt, stones, and the like. Such debris may cause damage to surrounding objects, such as windows, gutters, and downspouts. Although weed trimmers have been developed in multiple configurations, weed trimmers have not been utilized for leaf disposal, until now.

In light of the above drawbacks, the inventor has identified a need for an alternative to conventional leaf disposal techniques. The instant application seeks to overcome limitations in property maintenance technology. Accordingly, a modular leaf shredder is provided and described herein.

SUMMARY OF THE INVENTION

The embodiments of the present invention are directed to a modular leaf shredder that substantially addresses or obviates one or more limitations or disadvantages of the related art.

Features and advantages of the invention are set forth in the description which follows, or will be apparent from the description, or may be learned by practice of the invention.

In one example, a modular leaf shredder includes a housing having a plurality of interlocking housing subsections, a trimmer connector adapted to form a physical connection with a cooperating member of a trimmer in order to physically join the modular leaf shredder to the trimmer, wherein a rotating head of the trimmer includes at least three sets of cutting wires, at least two sets of cutting wires being substantially perpendicular to each other.

In the various embodiments, the plurality of interlocking housing subsections of the housing may be interconnected using at least one of a track connector, a latch connector, a plug connector, or a screw connector.

The trimmer connector adapted to form the physical connection with the cooperating member of the trimmer may form a physical connection with a shaft of the trimmer, wherein shaft of the trimmer is either straight or curved. Alternatively, the trimmer connector may be configured to connect to a push trimmer, walk trimmer, edger, or other lawncare or gardening machine.

The housing and/or housing subsections may be arranged to provide a modular leaf shredder that has a circular dome-shaped structure. The housing of the modular leaf shredder may be made of molded plastic or other lightweight and durable materials.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

A modular leaf shredder is provided. The modular leaf shredder includes a housing having a plurality of interlocking housing subsections. The modular leaf shredder further includes a trimmer connector adapted to form a physical connection with a cooperating member of a trimmer in order to physically join the housing to the trimmer. The rotating head of the trimmer includes at least three sets of cutting wires. At least two sets of cutting wires may be substantially perpendicular to each other.

Figure 1:
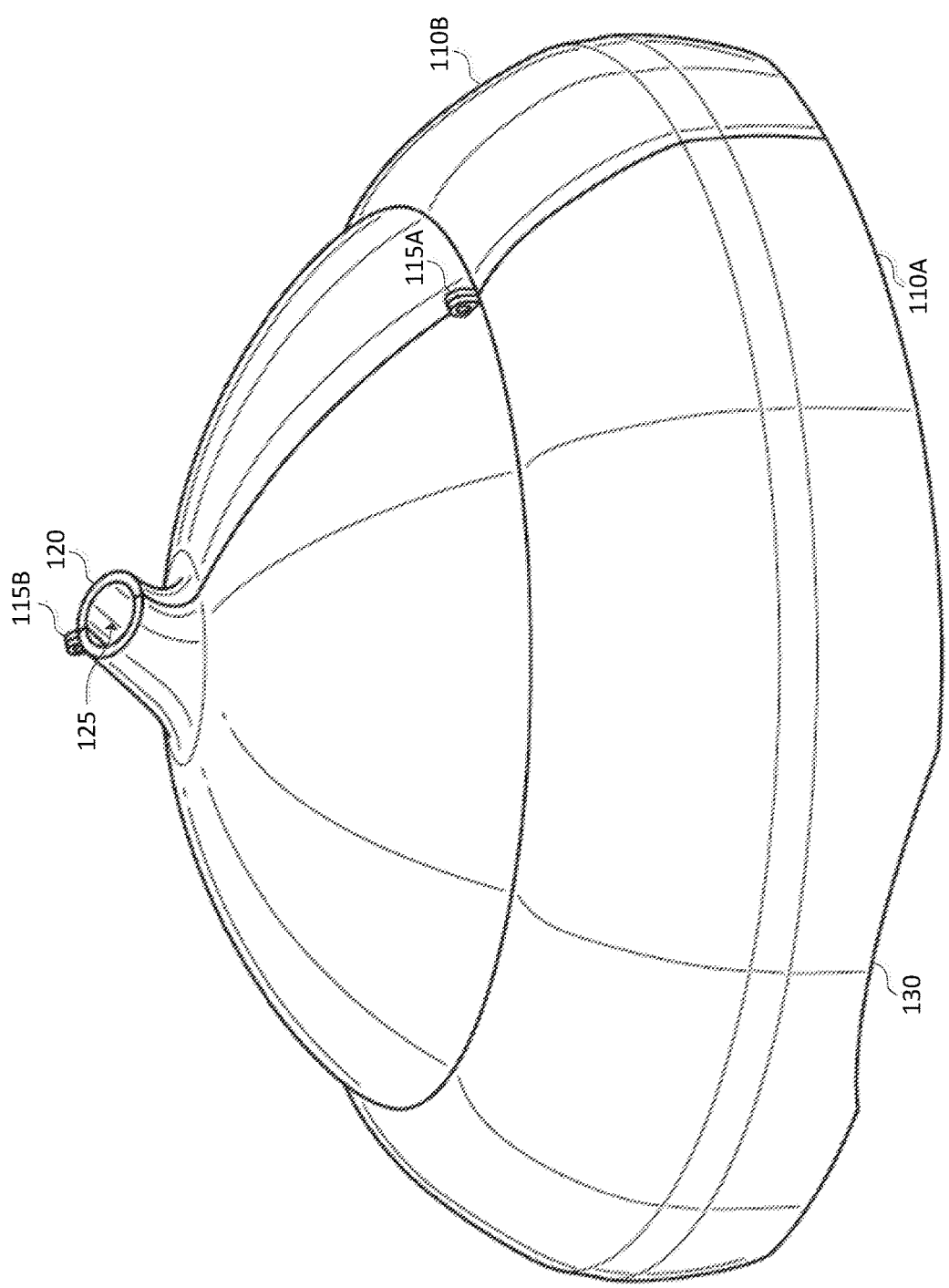
FIG. 1 illustrates a modular leaf shredder arranged in an example configuration.

FIG. 1 illustrates a modular leaf shredder arranged in an example configuration. As shown in FIG. 1, a modular leaf shredder 100 may include a housing 110, a trimmer connector 120, and one or more openings 130. The arrangement of this example embodiment, using a top-mounted trimmer connector 120, is configured for a trimmer having a curved shaft, especially a residential grade trimmer.

Figure 4:
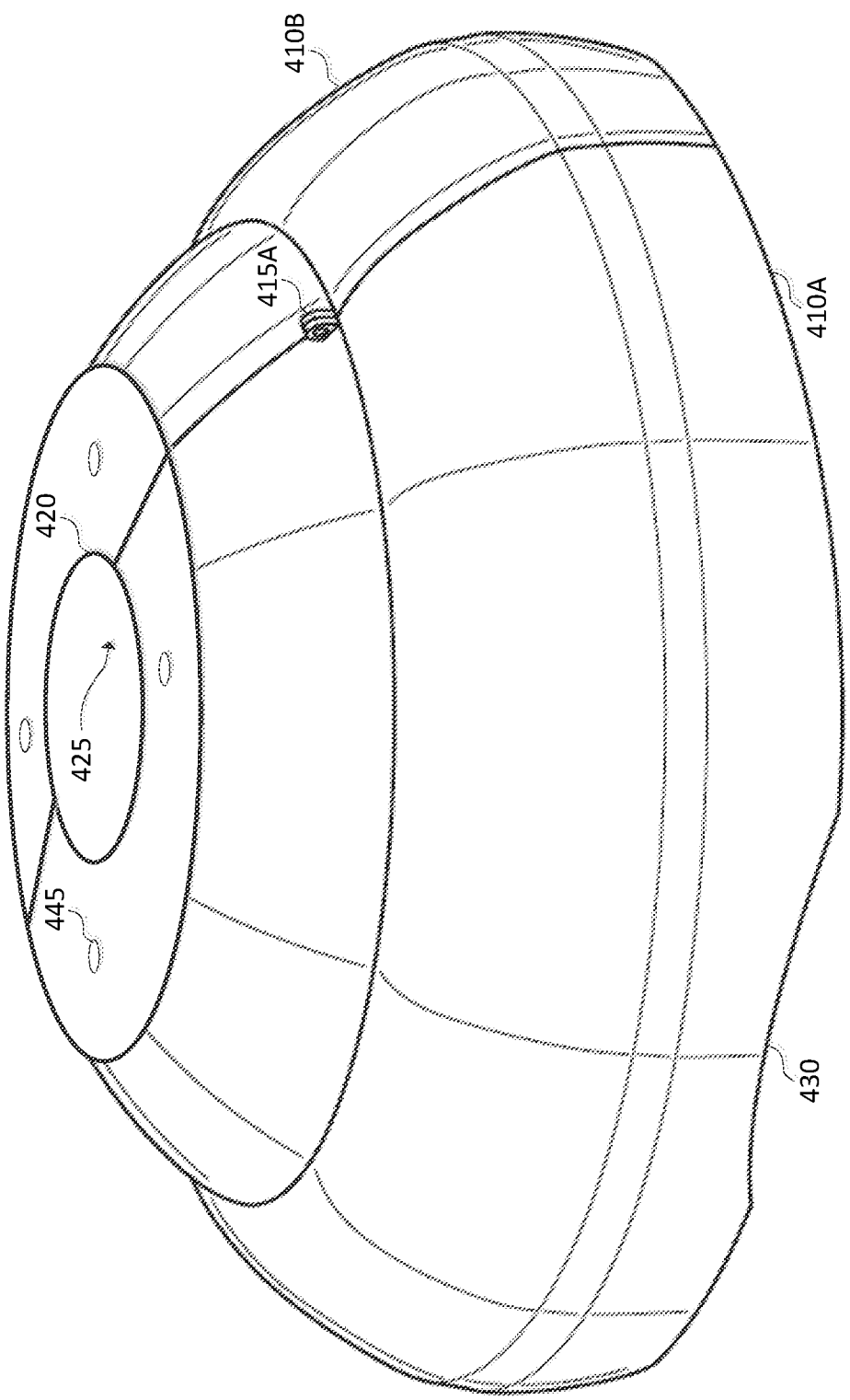
FIG. 4 illustrates a modular leaf shredder configured for a push or walk trimmer according to another example configuration.

Housing 110 may be formed as a single unit, or alternatively, may be formed by coupling one or more housing subsections. When being sold as a dedicated leaf shredder, the embodiments may utilize a housing formed from a single unit. Alternatively, when being sold as an accessory for a commercially available trimmer, the housing may include one or more housing subsections. In the example configuration of FIG. 1, housing 110 includes housing subsections 110A, 110B. In addition, each of housing subsections 110A, 110B may be joined to one another using one or more housing connectors, such as housing connectors 115A, 115B. The use of multiple housing subsections 110A, 110B enables housing 110 to detachably receive a trimmer head through an opening 125 of trimmer connector 120. For example, trimmer connector 120 may be configured to receive trimmer head 400 which is depicted in FIG. 4. In the various embodiments, trimmer connector 120 may be configured to be detachably coupled to a trimmer having a curved or straight rod. In other embodiments, trimmer connecter 120 may be configured to be detachably coupled to a push trimmer. In push trimmer configurations, the circular dome-shaped structure of modular leaf shredder 100 may have a planer upper surface so that it can be mounted to the push trimmer.

A variety of housing connectors 115A, 115B may be used in order to physically join or connect each housing subsection to an adjoining housing subsection. As would be understood by a person of ordinary skill in the art, in the context of this description, a connector "physically" connects or forms a "physical" connection between two units when those two units are rigidly interlocked. When two housing subsections are physically connected, they are connected together such that they only can be moved together. Some example connector types for forming a physical connection between housing components include screw, track, latch, and plug connectors, but the embodiments of the invention are not so limited. For example, track connectors may include a tongue-like structure that can be used as male first connector and a groove structure that can be used as female second connector.

Housing 110 and housing subsections 110A, 110B can be formed from various lightweight materials. Example materials include a variety of plastics, preferably durable and lightweight plastics. Lightweight metals, such as aluminum, can also be used. Although a circular dome-shaped housing is illustrated in FIG. 1, other cross-sectional shapes are also feasible, such as triangular, square, rectangular, hexagonal, and octagonal shapes, but the embodiments of the invention are not so limited. Regardless of the material and cross-sectional shape, each component of housing 110 and housing subsections 110A, 110B should be strong enough to support to form a durable connection with the trimmer, and strong enough to withstand the forces of the debris produced by the trimmer.

The housing 110 and housing subsections 110A, 110B may be constructed using a variety of molding processes. For example, a process of biaxial rotomolding using a base of medium density powdered polyethylene with ultra-violet inhibitors may be used. Alternatively, the system may be produced using three dimensional ("3D") printing.

When modular leaf shredder 100 is not coupled to a trimmer, it may be stored and the trimmer may be used in a conventional manner. However, when modular leaf shredder 100 is coupled to a trimmer, modular leaf shredder 100 shreds the leaves entering housing 110 through one or more openings 130. In particular, the leaves are shredded into very fine particles that may be left to remain on the homeowner's lawn or other area. In the alternative, housing 110 may be equipped with an external output orifice that may be coupled to a fan-driven suction and bag system (not shown). By leaving the shredded leaves on the homeowners lawn, modular leaf shredder 100 eliminates the need for rakes, leaf blowers, and bags. In addition, the remaining shredded leaf particles act as a fertilizer or compost for the homeowner's lawn.

Figure 2:
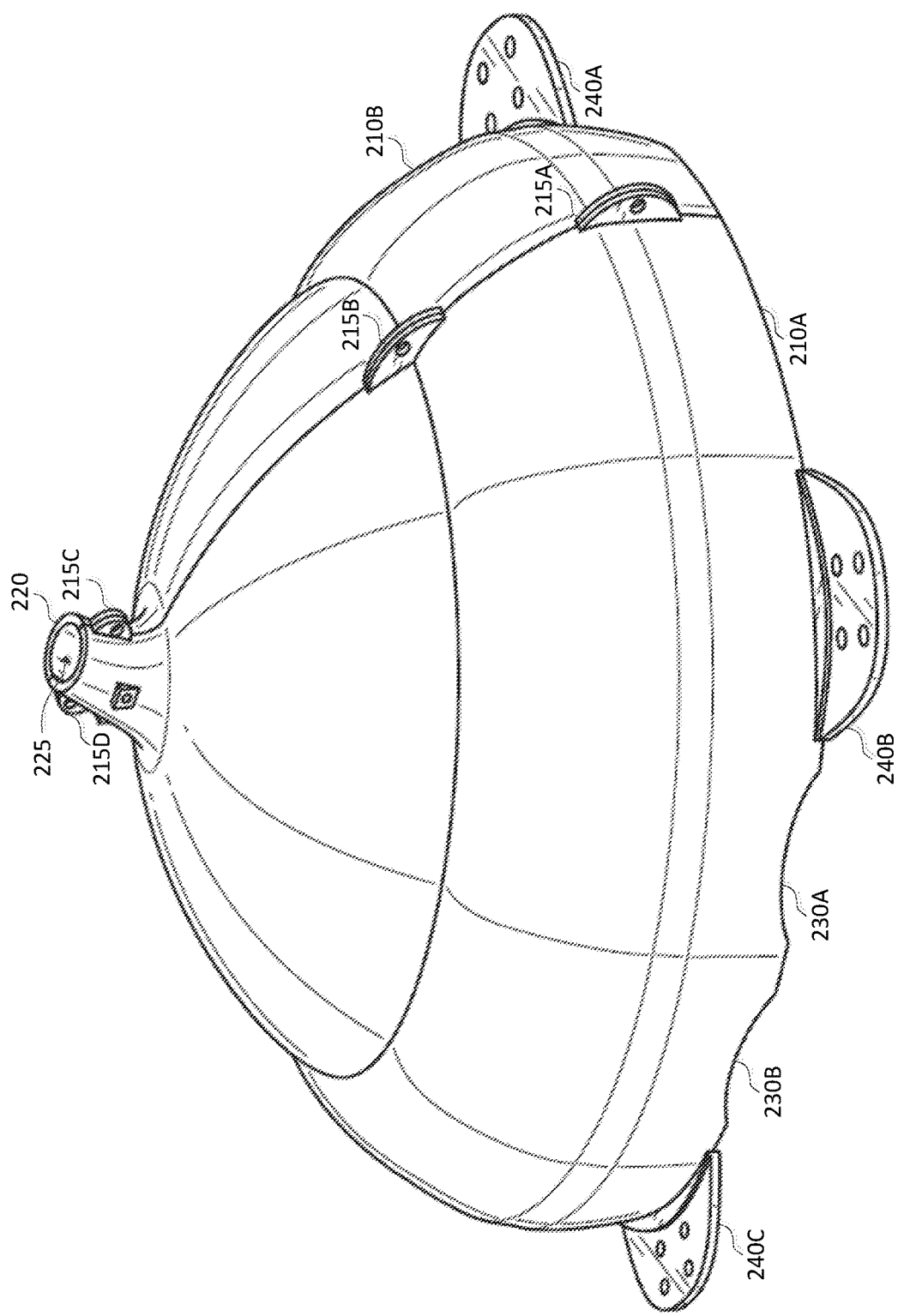
FIG. 2 illustrates a modular leaf shredder arranged in another example configuration.

FIG. 2 illustrates a modular leaf shredder arranged in another example configuration. As shown in FIG. 2, a modular leaf shredder 200 may include a housing 210, a trimmer connector 220, a plurality of openings 230, and a plurality of wheel mounts 240. The arrangement of this example embodiment, using a top-mounted trimmer connector 220, is configured for a trimmer having a curved shaft, especially a residential grade trimmer.

Housing 210 may be formed as a single unit, or alternatively, may be formed by coupling one or more housing subsections. In the example configuration of FIG. 2, housing 210 includes housing subsections 210A, 210B. In addition, each of housing subsections 210A, 210B may be joined to one another using one or more housing connectors, such as housing connectors 215A, 215B, 215C, 215D. The use of multiple housing subsections 210A, 210B enables housing 210 to detachably receive a trimmer head through an opening 225 of trimmer connector 220.

As discussed above, a variety of housing connectors 215A, 215B may be used in order to physically join or connect each housing subsection to an adjoining housing subsection. Example connector types for forming a physical connection between housing components include screw, track, latch, and plug connectors, but the embodiments of the invention are not so limited.

As also discussed above, housing 210 and housing subsections 210A, 210B can be formed from various lightweight and durable materials. Example materials include a variety of plastics, preferably durable and lightweight plastics. Lightweight metals, such as aluminum, can also be used. Although a circular dome-shaped housing is illustrated in FIG. 2, other cross-sectional shapes are also feasible.

The example embodiment depicted in FIG. 2 further includes a plurality of wheel mounts 240, such as wheel mounts 240A, 240B, 240C. In this example configuration, a fourth wheel mount (not shown) may be disposed opposite wheel mount 240B, however, numerous wheel mount configurations are feasible, such as three or five wheel configurations. Each of wheel mounts 240 is configured to be coupled to a wheel (not shown). Although the wheel mounts 240 depicted in FIG. 2 are formed to protrude exteriorly from the base of housing 210, numerous other configurations are also feasible. For example, the wheel mounts may be configured to protrude within the interior of housing 210. In another example, the wheel mounts may be configured to protrude (exteriorly or interiorly) from a predetermined height raised above the base of housing 210 (e.g., ¾ of an inch). In yet another example, the wheel mounts may be configured to be integrally formed along the perimeter of housing 210.

Regardless of the type of wheel mount used, a variety of wheel types may be used. Example wheel types include standard, orientable, multi-directional, and omnidirectional wheels, but the embodiments of the invention are not so limited.

When modular leaf shredder 200 is coupled to a trimmer, modular leaf shredder 200 shreds the leaves entering housing 210 through one or more openings 230. In particular, the leaves are shredded into very fine particles that may be left to remain on the homeowner's lawn or other area.

Figure 3:
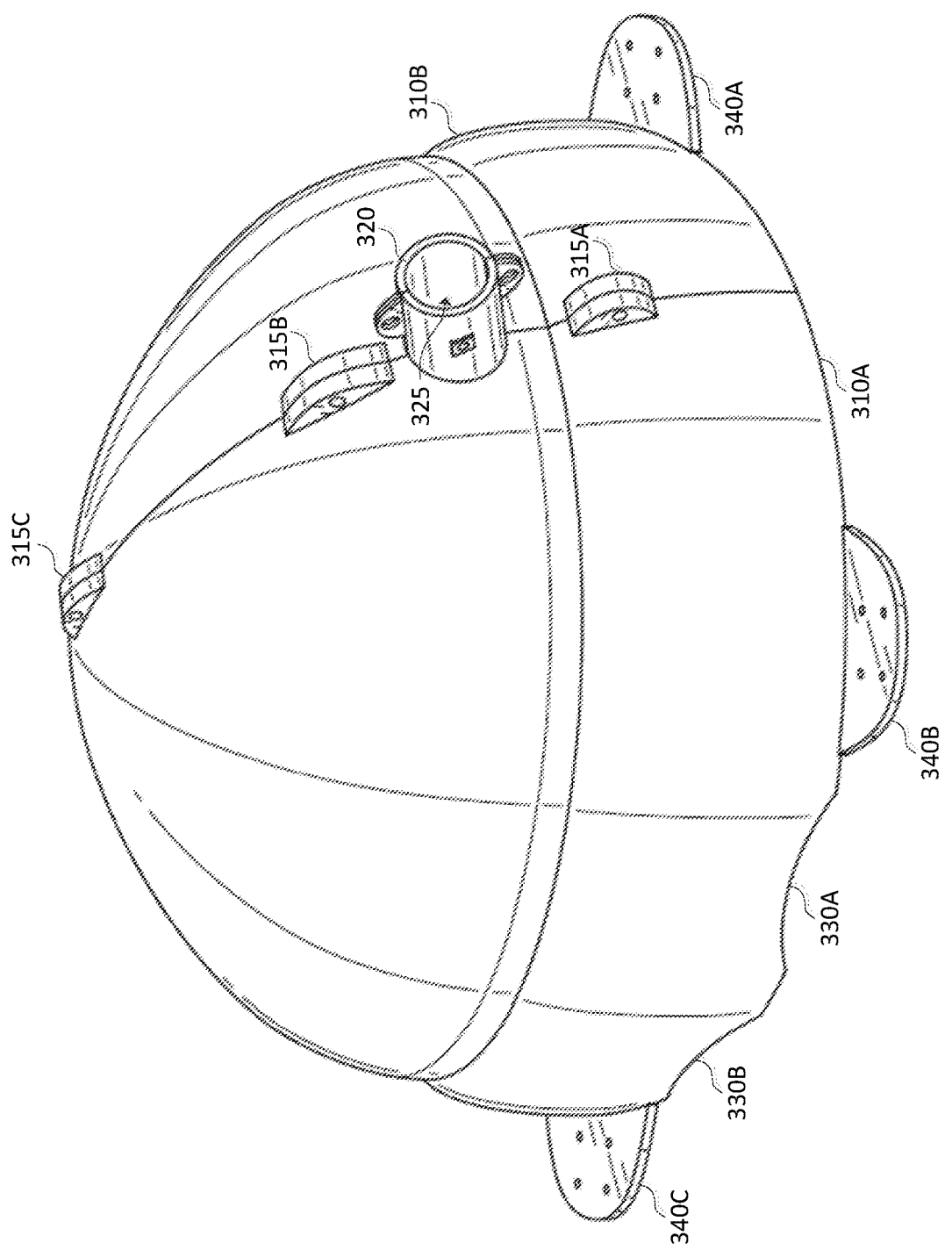
FIG. 3 illustrates a modular leaf shredder arranged in yet another example configuration.

FIG. 3 illustrates a modular leaf shredder arranged in yet another example configuration. As shown in FIG. 3, a modular leaf shredder 300 may include a housing 310, a trimmer connector 320, a plurality of openings 330, and a plurality of wheel mounts 340. The arrangement of this example embodiment, using a side-mounted trimmer connector 320, is configured for a trimmer having a straight shaft, especially a residential grade trimmer.

Housing 310 may be formed as a single unit, or alternatively, may be formed by coupling one or more housing subsections. In the example configuration of FIG. 3, housing 310 includes housing subsections 310A, 310B. In addition, each of housing subsections 310A, 310B may be joined to one another using one or more housing connectors, such as housing connectors 315A, 315B, 315C. The use of multiple housing subsections 310A, 310B enables housing 310 to detachably receive a trimmer head through an opening 325 of trimmer connector 320. Trimmer connector 325 may be configured to receive a trimmer shaft at a plurality of angles, including angles in the range of 40-50 degrees relative to the ground.

As discussed above, a variety of housing connectors 315A, 315B may be used in order to physically join or connect each housing subsection to an adjoining housing subsection. Example connector types for forming a physical connection between housing components include screw, track, latch, and plug connectors, but the embodiments of the invention are not so limited.

As also discussed above, housing 310 and housing subsections 310A, 310B can be formed from various lightweight and durable materials. Example materials include a variety of plastics, preferably durable and lightweight plastics. Lightweight metals, such as aluminum, can also be used. Although a circular dome-shaped housing is illustrated in FIG. 3, other cross-sectional shapes are also feasible.

Modular leaf shredder 300 may include a plurality of wheel mounts 340, such as wheel mounts 340A, 340B, 340C. Of course, the shredder 300 may be implemented with or without wheel mounts 340. In this example configuration, a fourth wheel mount (not shown) may be disposed opposite wheel mount 340B, however, numerous wheel mount configurations are feasible, such as three or five wheel configurations. Each of wheel mounts 340 is configured to be coupled to a wheel (not shown). Although the wheel mounts 340 depicted in FIG. 3 are formed to protrude exteriorly from the base of housing 310, numerous other configurations are also feasible. For example, the wheel mounts may be configured to protrude within the interior of housing 310. In another example, the wheel mounts may be configured to protrude (exteriorly or interiorly) from a predetermined height raised above the base of housing 210 (e.g., ¾ of an inch). In yet another example, the wheel mounts may be configured to be integrally formed along the perimeter of housing 310.

As discussed above, a variety of wheel types may be used. Example wheel types include standard, orientable, multi-directional, and omnidirectional wheels, but the embodiments of the invention are not so limited.

When modular leaf shredder 300 is coupled to a trimmer, modular leaf shredder 300 shreds the leaves entering housing 310 through one or more openings 330. In particular, the leaves are shredded into very fine particles that may be left to remain on the homeowner's lawn or other area.

FIG. 4 illustrates a modular leaf shredder configured for a push or walk trimmer according to another example configuration. As shown in FIG. 4, a modular leaf shredder 400 may include a housing 410, trimmer connector 420, and a plurality of openings 430. The arrangement of this example embodiment, using a top-mounted trimmer connector 420, is configured for a push or walk trimmer. The top surface of trimmer connector 420 may be adapted to be coupled (e.g., flush mounted) to a lower surface of the push or walk trimmer, and to further enclose its trimmer head.

Housing 410 may be formed as a single unit, or alternatively, may be formed by coupling one or more housing subsections. In the example configuration of FIG. 4, housing 410 includes housing subsections 410A, 410B. In addition, each of housing subsections 410A, 410B may be joined to one another using one or more housing connectors, such as housing connectors 415A, 415B, 415C. The use of multiple housing subsections 410A, 410B enables housing 410 to detachably receive a trimmer head through an opening 425 of trimmer connector 420.

As discussed above, a variety of housing connectors 415A, 415B may be used in order to physically join or connect each housing subsection to an adjoining housing subsection. In addition, a variety of undermount connectors 445 may be used in order to physically join or connect housing 410 to an adjoining member of the push or walk trimmer. Example connector types for forming a physical connection between housing components include screw, track, latch, and plug connectors, but the embodiments of the invention are not so limited.

As also discussed above, housing 410 and housing subsections 410A, 410B can be formed from various lightweight and durable materials. Example materials include a variety of plastics, preferably durable and lightweight plastics. Lightweight metals, such as aluminum, can also be used. Although a circular dome-shaped housing is illustrated in FIG. 4, other cross-sectional shapes are also feasible.

When modular leaf shredder 400 is coupled to the push or walk trimmer, modular leaf shredder 400 shreds the leaves entering housing 410 through one or more openings 430. In particular, the leaves are shredded into very fine particles that may be left to remain on the homeowner's lawn or other area.

Figure 5:
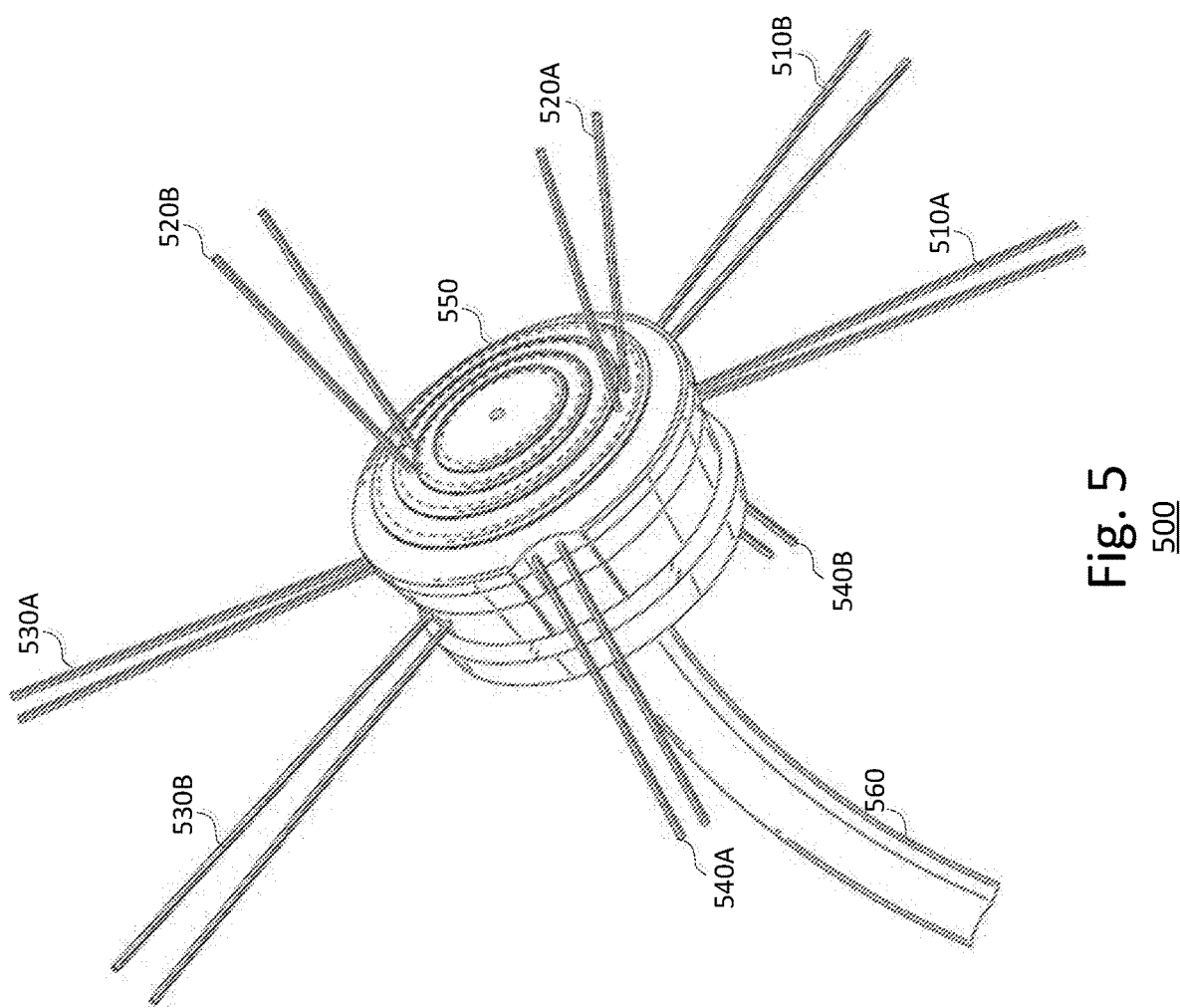
FIG. 5 illustrates a rotating trimmer head for use with any modular leaf shredder of the embodiments arranged in an example configuration.

FIG. 5 illustrates an example rotating trimmer head for use with any modular leaf shredder of the embodiments arranged in an example configuration. As shown in FIG. 5, a trimmer head 500 includes multiples sets of wires or lines, such as 510A, 510B, 520A, 520B, 530A, 530B, 540A, 540B, a rotating head 550, and a trimmer shaft 560. Notably, 540A and 540B may be disposed in an upward direction, for example, relative to ground when the trimmer is activated.

The wires may be oriented to protrude from the trimmer head at a variety of angles relative to ground. For example, a face of the trimmer head may be oriented and arranged to be parallel to ground during operation and the wires may be arranged to be forty-five degrees deflected from ground.

Multiples sets of wires or lines 510, 520, 530, and 540 emanate from rotating head 550. In addition, each of wires or line sets 510, 520, 530, and 540 are arranged to be opposite or substantially perpendicular one another. For example, wire or line sets 510 and 530 are arranged in opposing directions. In another example, wire or line sets 510 and 520 are arranged in a substantially perpendicular configuration. Wire or line sets 510 and 540 are also arranged in a substantially perpendicular configuration. The wires or lines may be composed of plastics, composites, metals, alloys, and other suitable materials.

The combined arrangement of wire or line sets 510, 520, 530, and 540 are designed to loosen and/or pull leaves so that the leaves can be more efficiently shredded. For example, wires or lines 520 may operate to loosen and pull leaves into any of the modular leaf shredders described herein. The addition of wires or lines 540 to rotating head 550 operate to more effectively shred the leaves that enter the modular leaf shredders. The size of the dome or modular housing unit, assembled, may be adapted to complement the size and shape of the wires protruding from the trimmer head.

Embodiments of FIGS. 1-4 may be used with rotating trimmer head 500, but may also be used with a variety of commercially available trimmers. Optional trimmer shaft 560 may be straight or curved, as discussed above. In addition, some trimmers such as walk or push trimmers may not include an external trimmer shaft, such as trimmer shaft 560.

Figure 6:
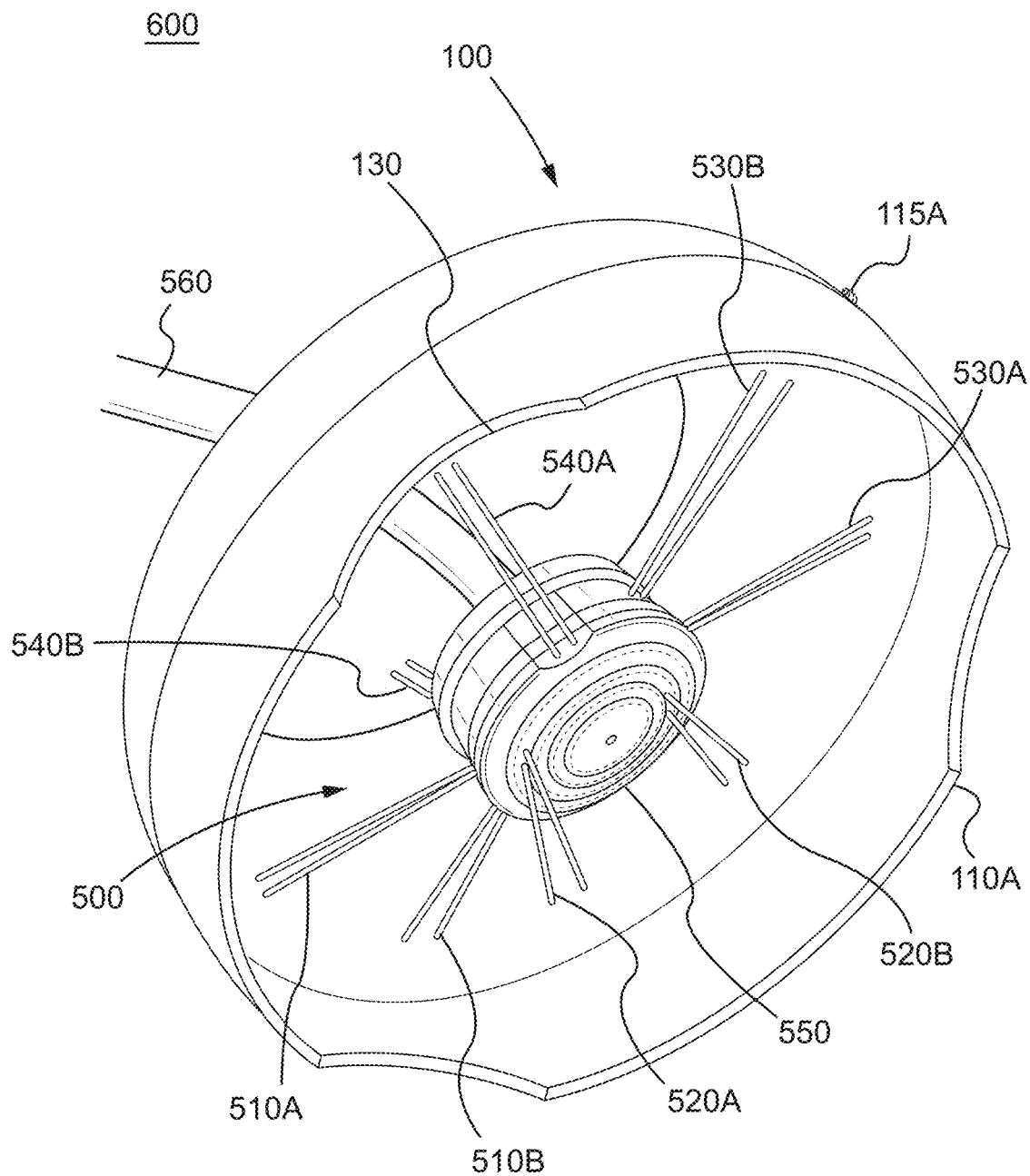
FIG. 6 illustrates a perspective bottom view of a modular leaf shredder arranged in an example configuration.

FIG. 6 is a perspective bottom view of a modular leaf shredder arranged in an example configuration described above. As shown in FIG. 6, trimmer head 500 as illustrated in FIG. 5 is connected with housing 110 illustrated in FIG. 1 via a physical connection between trimmer shaft 560 and trimmer connector 120 shown in FIG. 1 (not shown in FIG. 6). One or more openings 130 are disposed at the bottom edge of housing 110 along the perimeter of housing 110 to allow leaves to enter housing 110 through thereof. Multiples sets of wires or lines, such as 510A, 510B, 520A, 520B, 530A, 530B, 540A, 540B, emanate from rotating head 550. Both rotating head 550 and the multiple sets of wires or lines are enclosed within housing 110 and confined inside the perimeter of the base of housing 110. As shown in FIG. 6, each of wires or line sets 510, 520, 530, and 540 are arranged to be opposite or substantially perpendicular one another. For example, wire or line sets 510 and 530 are arranged in opposing directions. In another example, wire or line sets 510 and 520 are arranged in a substantially perpendicular configuration. Wire or line sets 510 and 540 are also arranged in a substantially perpendicular configuration.

Notably, the multiple sets of wires or lines enclosed within housing 110 may be oriented to protrude from rotating head 550 at a variety of angles relative to ground. For example, wires or lines 540A and 540B may be disposed in an upward direction relative to ground when the trimmer is activated. A face of rotating head 550 may be oriented and arranged to be parallel to ground during operation and the wires may be arranged to be forty-five degrees deflected from ground, such as wires or lines 520A, 520B, 540A, and 540B shown in FIG. 6. The combined arrangement of wire or line sets 510, 520, 530, and 540 are designed to loosen and/or pull leaves so that the leaves can be more efficiently shredded. For example, wires or lines 520 may operate to loosen and pull leaves into housing 110 through the one or more openings 130. The addition of wires or lines 540 to rotating head 550 operate to more effectively shred the leaves that enter housing 110. The size of the housing may be adapted to complement the size and shape of the wires protruding from the rotating head.

It will be apparent to those skilled in the art that various modifications and variations can be made in the modular leaf shredder of the present invention without departing from the spirit or scope of the invention. Thus, it is intended that the present invention cover the modifications and variations of this invention provided they come within the scope of the appended claims and their equivalents.

I claim:

1. A modular leaf shredder, the modular leaf shredder comprising:
   a housing comprising an upper portion and a lower portion, the housing comprising a plurality of interlocking housing subsections; and
   a trimmer connector that is mounted on the housing and forms a physical connection with a cooperating member of a trimmer, thereby allowing the housing to physically join the trimmer;
   wherein the upper portion comprises an approximately dome shaped structure arranged above the lower portion, and the lower portion comprises an approximately tubular structure, with the upper portion being tapered from a border with the lower portion towards the trimmer connector;
   wherein the housing of the modular leaf shredder is fully encloses a trimmer head arranged at the end of a shaft, the trimmer head comprising a rotating head and a plurality of cutting wire sets protruding from the rotating head within the perimeter of the housing, the plurality of cutting wire sets being oriented to protrude from the rotating head at multiple angles such that a first set of cutting wires protrudes parallel to ground when the trimmer is activated, a second set of cutting wires protrudes below the first set of cutting wires, and a third set of wires protrudes above the first set of cutting wires; and
   wherein the housing comprises at least one opening at a bottom edge of the housing allowing leaves to enter the housing through the at least one opening.

2. The modular leaf shredder according to claim 1, wherein the plurality of interlocking housing subsections of the housing are interconnected using a plurality of screw connectors.

3. The modular leaf shredder according to claim 1, wherein the cooperating member of the trimmer is the shaft.

4. The modular leaf shredder according to claim 3, wherein the shaft of the trimmer is either straight or curved.

5. The modular leaf shredder according to claim 1, wherein the plurality of cutting wire sets protruding from the rotating head include at least three sets of cutting wires, at least two sets of cutting wires being substantially perpendicular to each other and at least one set of cutting wires being disposed in a direction of about forty-five degrees deflected from ground when the trimmer is activated.

6. The modular leaf shredder according to claim 1, wherein the housing of the modular leaf shredder is made of molded plastic or lightweight metal.

7. The modular leaf shredder according to claim 1, wherein the housing of the modular leaf shredder has an overall circular dome-shaped structure.

8. The modular leaf shredder according to claim 1, wherein the housing further includes a plurality of wheel mounts at the base of the housing, each of the plurality of wheel mounts being configured to attach to a wheel.

9. The modular leaf shredder according to claim 8, wherein the plurality of wheel mounts protrude exteriorly from the base of the housing.

10. The modular leaf shredder according to claim 8, wherein the plurality of wheel mounts is configured to be integrally formed along the perimeter of the housing.

11. The modular leaf shredder according to claim 1, wherein the trimmer connector is located at a top surface of the housing.

12. The modular leaf shredder according to claim 1, wherein the trimmer connector is located at a side surface of the housing.

13. A modular leaf shredder, the modular leaf shredder comprising:
   a housing comprising an upper portion and a lower portion, the housing having a plurality of interlocking housing subsections;
   a trimmer comprising a trimmer head and a cooperating member; and
   a trimmer connector mounted on the housing;
   wherein the trimmer connector forms a physical connection with the cooperating member, thereby allowing the housing to physically join the trimmer;
   wherein the upper portion comprises an approximately dome shaped structure arranged above the lower portion, and the lower portion comprises an approximately tubular structure, with the upper portion being tapered from a border with the lower portion towards the trimmer connector;
   wherein the housing fully encloses the trimmer head at the end of a shaft, the trimmer head comprising a rotating head and at least three sets of cutting wires protruding from the rotating head within the perimeter of the housing, and the at least three sets of cutting wires comprise a first set of cutting wires being arranged approximately parallel to a base of the lower portion of the housing, a second set of cutting wires being arranged to protrude below the first set of wires, and a third set of cutting wires being arranged to protrude above the first set of wires; and
   wherein the housing comprises at least one opening at a bottom edge of the housing allowing leaves to enter the housing through the at least one opening.

14. The modular leaf shredder according to claim 13, wherein the plurality of interlocking housing subsections of the housing are interconnected using a plurality of screw connectors.

15. The modular leaf shredder according to claim 13, wherein the cooperating member is the shaft.

16. The modular leaf shredder according to claim 15, wherein the shaft of the trimmer is either straight or curved.

17. The modular leaf shredder according to claim 7, wherein the housing of the modular leaf shredder has an overall circular dome-shaped structure.

18. The modular leaf shredder according to claim 7, wherein the housing of the modular leaf shredder is made of molded plastic or a lightweight metal.

19. The modular leaf shredder according to claim 7, wherein the trimmer is a push trimmer.

20. The modular leaf shredder according to claim 7, wherein at least two sets of cutting wires being substantially perpendicular to each other and at least one set of cutting wires being disposed in a direction of about forty-five degrees deflected from ground when the trimmer is activated.

* * * * *